(12) United States Patent
Kozak (10) Patent No.: US 8,789,447 B2
(45) Date of Patent: Jul. 29, 2014

(54) EXTENSION SHAFT FOR HOLD A TOOL FOR ROTARY DRIVEN MOTION

(75) Inventor: Burt Kozak, Chicago, IL (US)

(73) Assignee: Eazypower Corporation, Chicago, IL (US)

( * ) Notice: Subject to any disclaimer, the term of this patent is extended or adjusted under 35 U.S.C. 154(b) by 272 days.

(21) Appl. No.: 13/344,449

(22) Filed: Jan. 5, 2012

(65) Prior Publication Data

US 2012/0125164 A1 May 24, 2012

Related U.S. Application Data

(63) Continuation-in-part of application No. 12/908,443, filed on Oct. 20, 2010, now Pat. No. 8,117,950, which is a continuation of application No. 12/284,156, filed on Sep. 18, 2008, now abandoned.

(51) Int. Cl.
*B25B 23/16* (2006.01)
*B23B 45/00* (2006.01)
*B25B 23/00* (2006.01)
*B25G 1/02* (2006.01)
*B25G 1/04* (2006.01)

(52) U.S. Cl.
CPC ........... *B23B 45/005* (2013.01); *B25B 23/0014* (2013.01); *B25G 1/025* (2013.01); *B25G 1/043* (2013.01); *B25B 23/0028* (2013.01); *B25B 23/0021* (2013.01)
USPC ...................................... 81/177.6; 81/177.85

(58) Field of Classification Search
USPC .......... 81/177.1, 177.2, 177.6, 177.75, 177.8, 81/177.85, 438, 439
See application file for complete search history.

(56) References Cited

U.S. PATENT DOCUMENTS

| | | | | | |
|---|---|---|---|---|---|
| 868,454 | A | * | 10/1907 | Korth | 81/177.75 |
| 1,624,530 | A | * | 4/1927 | Caruso | 81/438 |
| 1,903,660 | A | * | 4/1933 | Smith et al. | 81/57.43 |
| 2,196,297 | A | * | 4/1940 | Gagne | 464/119 |
| 2,499,569 | A | * | 3/1950 | Cooley | 464/136 |
| 2,794,357 | A | * | 6/1957 | Lykins, Jr. | 81/177.75 |
| 3,399,584 | A | * | 9/1968 | Lewicki | 81/177.6 |
| 3,897,703 | A | * | 8/1975 | Phipps | 81/177.75 |
| 4,277,992 | A | * | 7/1981 | Koltveit | 81/177.75 |
| 4,730,960 | A | * | 3/1988 | Lewis et al. | 408/127 |
| 5,697,269 | A | * | 12/1997 | Tseng | 81/177.6 |
| 5,732,606 | A | * | 3/1998 | Chiang | 81/177.2 |
| 6,044,733 | A | * | 4/2000 | Liu | 81/177.6 |
| 6,145,416 | A | * | 11/2000 | Bonniot | 81/177.75 |
| 6,267,681 | B1 | * | 7/2001 | Cleveland, III | 464/119 |
| 6,347,564 | B1 | * | 2/2002 | Ciocca | 81/177.8 |
| 6,386,074 | B1 | * | 5/2002 | Yang | 81/177.7 |
| 6,390,927 | B1 | * | 5/2002 | Cleveland, III | 464/119 |
| 6,412,373 | B1 | * | 7/2002 | Hsiao | 81/177.7 |
| 6,626,071 | B2 | * | 9/2003 | Kesinger et al. | 81/437 |
| 6,862,958 | B2 | * | 3/2005 | Schade | 81/177.6 |
| 6,952,986 | B2 | * | 10/2005 | Fu | 81/177.6 |

(Continued)

*Primary Examiner* — David B Thomas
(74) *Attorney, Agent, or Firm* — Factor Intellectual Property Law Group (57) ABSTRACT

A tool having a flexible extension shaft, a first end and, a second end and capable of being bent about its axis. The tool transfers rotary motion from a device to an implement. Both of the ends may be capable of independently being bent about the axis. The shaft may include a male member and a female member for a kit. Further, one end of the tool may include a rotatable member having a first and second implement.

3 Claims, 10 Drawing Sheets

(56) References Cited

U.S. PATENT DOCUMENTS

| | | | | |
|---|---|---|---|---|
| 6,976,411 | B1* | 12/2005 | Yu | 81/177.2 |
| 7,117,769 | B2* | 10/2006 | Somers | 81/177.75 |
| 7,185,568 | B1* | 3/2007 | Vance | 81/177.2 |
| 7,363,839 | B2* | 4/2008 | Chiang | 81/177.75 |
| 7,430,943 | B2* | 10/2008 | Chiang | 81/177.7 |
| 7,597,031 | B2* | 10/2009 | Chiang | 81/177.7 |
| 2002/0121164 | A1* | 9/2002 | Somers | 81/177.75 |
| 2002/0151368 | A1* | 10/2002 | Chang | 464/114 |
| 2003/0188609 | A1* | 10/2003 | Crawley | 81/439 |
| 2003/0200843 | A1* | 10/2003 | Lin | 81/438 |
| 2004/0177730 | A1* | 9/2004 | Kozak | 81/177.6 |
| 2006/0156872 | A1* | 7/2006 | Hsieh | 81/177.75 |
| 2006/0260446 | A1* | 11/2006 | Chang | 81/177.75 |
| 2006/0266166 | A1* | 11/2006 | Weber | 81/184 |
| 2010/0294089 | A1* | 11/2010 | Lai | 81/177.6 |
| 2011/0041657 | A1* | 2/2011 | Hung | 81/60 |
| 2012/0031239 | A1* | 2/2012 | Hu et al. | 81/62 |
| 2012/0132038 | A1* | 5/2012 | Lefler | 81/177.6 |
| 2012/0180605 | A1* | 7/2012 | Ahrens | 81/177.2 |

* cited by examiner

EXTENSION SHAFT FOR HOLD A TOOL FOR ROTARY DRIVEN MOTION

RELATED APPLICATIONS

This application is a continuation-in-part of U.S. Ser. No. 12/908,443 filed on Oct. 20, 2010 which is a continuation of U.S. Ser. No. 12/284,156, filed on Sep. 18, 2008, the contents of both of which are incorporated herein by reference.

FIELD OF THE INVENTION

The present invention generally relates to an extension shaft capable of holding a variety of tools to be rotary driven by a handheld instrument; and more particularly, to providing an extension shaft with an increased range of angular movement of the tool with respect to the handheld instrument.

BACKGROUND OF THE INVENTION

A handheld instrument capable of being used with multiple types of tools—e.g., drill bits, screwdriver bits, sockets, etc. in standard and metric dimensions—is very popular because it provides a user with the ability to readily adapt the handheld instrument among a variety of workplace needs without requiring the user to carry along an extensive set of individually dedicated tools.

Each tool is fashioned to be axially inserted into a chuck of the handheld instrument, which typically positions the tool in close proximity to the handheld instrument's relatively large handle. As a result, the handheld instrument may at times be rather ineffective for use in spatially confined or difficult-to-reach locations.

In this connection, a powered handheld instrument—corded or cordless—may also be used. Although such a powered instrument, e.g., screwdriver, drill; is generally relatively long in length, it does provide the user with the ability to easily complete various tasks with less manual effort. In addition, the powered instrument generally includes a casing surrounding its motor that is rather large in relation to the tools, i.e., drill bits, screwdriver tips, sockets, and the like. For this reason, it has been difficult to use the powered instrument in areas of limited access.

The present invention is directed to addressing the spatial constraints frequently encountered by today's user during use of a handheld instrument capable of being utilized with various tools.

SUMMARY OF THE INVENTION

Accordingly, the present invention is directed to an extension shaft for holding a tool for rotary driven motion. The extension shaft is capable of being adapted to a handheld instrument having a chuck. The extension shaft includes a first end adapted to cooperate with the chuck and be releasably retained thereby; and a second end adapted to releasably retain the tool for rotary driven motion. The first end of the extension shaft and the chuck have complementarily shaped non-circular cross-sections, wherein the first end has an axis and is capable of being releasably retained by the chuck. The second end of the extension shaft includes a tool holder for holding the tool for rotary driven motion thereof. The tool holder and the tool have complementarily shaped non-circular cross-sections. The tool holder further includes a base portion and a swivel portion. The swivel portion is capable of releasably retaining the tool within the tool holder and is pivotly coupled to the base portion through a pivot assembly.

The pivot assembly may include a ball joint operatively connecting the swivel and base portions of the tool holder. Alternatively, the pivot assembly may include a first and a second pin, shaft, or axle, wherein the first and second pins of the pivot assembly are substantially perpendicular to each other and lie substantially within a plane. In either embodiment of the pivot assembly, the tool is capable of being rotated about an angle with respect to an axis of the chuck or extension shaft through rotation of the extension shaft in response to rotation of the chuck. Thus, the tool holder of the present invention provides for the handheld instrument's effective operability to be maintained throughout an increase in the angular variation between the extension shaft and the tool.

In an additional embodiment of the tool holder, the pivot assembly includes a means for biasing the base and swivel portions into axial alignment when the tool holder is at rest. The predisposition of the pivot assembly to axially align the base and swivel portions will effectively steady the swivel portion and facilitate the insertion and/or removal of the tool.

In another embodiment of the present invention, a sheath may be placed over the cooperating moving parts of the tool holder to guard against contact therewith while simultaneously allowing the extension shaft to properly operate. The sheath can be a single, unitary piece or multiple pieces. In an alternate embodiment to guard against contact with the moving parts of the tool holder, a spacer can be placed proximate the pivot assembly, e.g., bearing of the ball joint; which will assist in preventing an operator from contacting the area around the rotating and hinging parts of the tool holder.

In a further embodiment of the present invention, the first or second end of the extension shaft preferably includes a generally cylindrical body portion terminating in a male hex shank and the other of the first or second end of the extension shaft preferably includes a cylindrical body portion terminating in the tool holder—e.g., base portion and swivel portion including a female hex shank-receiving opening therein.

In yet another embodiment of the present invention, the extension shaft is flexible and capable of deflecting relative to the axis of the chuck such that the position of the second end of the flexible extension shaft and the tool can be angled relative to the axis of the chuck, wherein the tool can be rotary driven by rotation of the chuck through rotation of the handheld instrument and the flexible extension shaft.

The flexible extension shaft may further include a plurality of concentric coil springs in tightly wound adjacent relation extending between and secured to generally cylindrical body portions near the first and second ends of the flexible extension shaft to accommodate deflection of the flexible extension shaft relative to the axis of the chuck, and including a flexible sleeve disposed about the concentric coil springs. The flexible sleeve has cylindrical fittings secured thereto at opposite ends thereof so as to define a shoulder internally of each of the fittings. Each cylindrical fitting is adapted to receive one of the cylindrical body portions therein. The cylindrical body portions are spaced apart by a distance greater than the distance between the shoulders in the cylindrical fittings, which permits limited axial movement of the cylindrical body portions and the concentric coil springs relative to the cylindrical fittings and the flexible sleeve. Such a configuration allows for the flexible extension shaft to be deflectable relative to the axis of the chuck so as to position the second end of the shaft and the tool at an angle relative to the axis of the chuck, so that the tool is capable of being rotary driven by rotation of the chuck and/or handheld instrument through the flexible extension shaft.

A shaft biasing coil spring can be advantageously disposed about the concentric coil springs of the flexible extension shaft. More specifically, the shaft biasing coil spring is disposed between the shoulder in one of the cylindrical fittings and the corresponding one of the cylindrical body portions to normally bias the other of the cylindrical body portions into engagement with the shoulder in the other of the cylindrical fittings.

An object of the present invention is to provide an extension shaft for holding a tool utilized with a handheld instrument, wherein the extension shaft is capable of increasing the operating capability of the handheld instrument and tool.

Another object of the present invention is to provide an extension shaft for holding a tool utilized with a handheld instrument, wherein the extension shaft includes a protective mechanism to safeguard the operator from harmful contact with the moving components of the extension shaft.

A still further object of the present invention is to provide an extension shaft for holding a tool utilized with a handheld instrument, wherein the extension shaft includes a tool holder with a means for biasing a base and swivel portion into axial alignment and thus steadying the swivel portion to facilitate insertion and/or removal of the tool when the extension shaft is idle.

Another object is to provide a tool having two ends that can bend independently of the flexible shaft.

A yet further object is to provide a kit having a flexible extension shaft tool, a male member, and a female member to allow for further extending the length of the shaft tool, as well as a variety of configurations to work with a variety of driving tools and objects to be worked on (i.e., fasteners).

Another object is to provide a device having an end with a rotatable member having a first implement and a second implement, allowing for a faster change of implements.

DETAILED DESCRIPTION OF THE PRESENT INVENTION

While this invention is susceptible to embodiments in many different forms, there are shown in the drawings and will herein be described in detail, preferred embodiments of the invention with the understanding that the present disclosures are to be considered as exemplifications of the principles of the invention and are not intended to limit the broad aspects of the invention to the embodiments illustrated.

Figure 1:
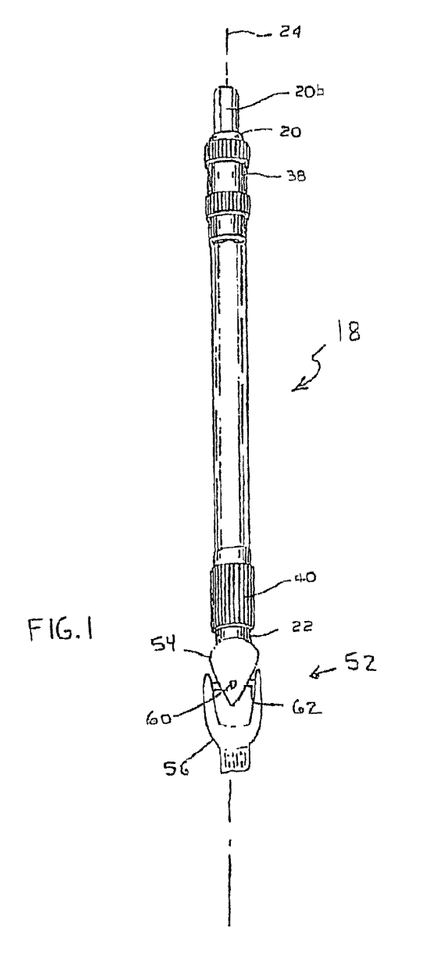
FIG. 1 is perspective view of a rigid extension shaft in accordance with one embodiment of the present invention.
Figure 2:
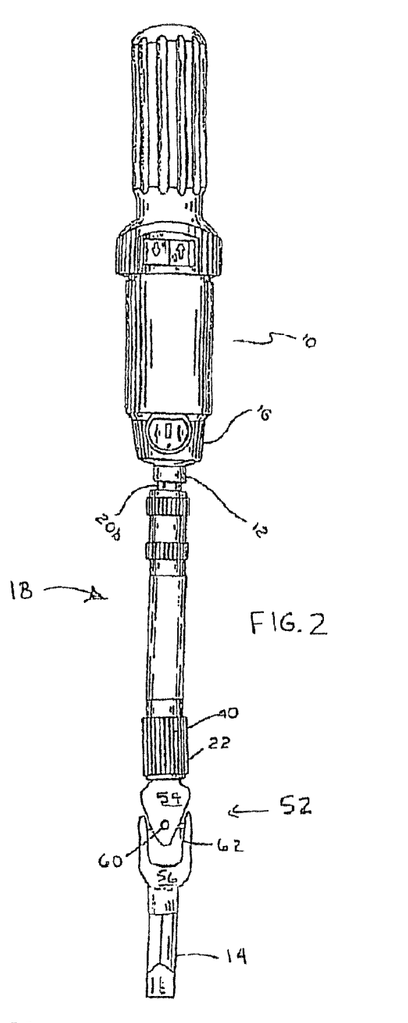
FIG. 2 is a perspective view of the rigid extension shaft shown in FIG. 1 and operatively attached to a handheld instrument and a tool.

Referring to the drawings, and first to FIGS. 1 and 2, the reference numeral 10 designates generally a handheld instrument or piece of equipment, e.g., screwdriver, drill; having a chuck 12 for connection to an extension shaft 18 for rotary driven motion at one end 16 thereof. The extension shaft 18 includes a first end 20 adapted to cooperatively extend from, or attach or connect with, the chuck 12; and, a second end 22 that may similarly be adapted for attachment or extension there from and to hold a tool 14 for rotary driven motion.

The first end 20 of the extension shaft 18 and the chuck 12 have complementarily shaped non-circular cross-sections, e.g., hexagonal, that may be similar to those shown in U.S.

Pat. No. 4,876,929—the entire contents of which are fully incorporated herein by reference. The chuck 12 has a longitudinal axis and is adapted to receive the first end 20b of the extension shaft 18 by means of axial insertion of the extension shaft into the chuck with the respective non-circular cross-sections in rotationally aligned relationship. The chuck 12 preferably also includes a means for holding the first end 20 of the extension shaft 18 for rotary driven motion of the shaft.

A tool holder 52 including a base portion 54 and a swivel portion 56 extends from or is operatively connected to the extension shaft 18 proximate the second end 22. It is to be understood that the term operatively as used herein connotes that the connection, attachment, coupling, integral extension there from, etc. can be accomplished through any one of a variety of ways known by those or ordinary skill in the art to utilize such cooperating components and to ensure their operability. In one instance, the base portion 54 of the tool holder 52 is integral with or extends from a cylindrical body portion 22 as is shown in FIG. 1. In another instance, the connection between the extension shaft 18 and the tool holder 52 can similarly utilize the complementarily shaped—e.g., male-female—non-circular cross-sections of mating components utilized between the chuck 12 and the first end 20 of the extension shaft 18. Likewise, the swivel portion 56 of the tool holder 52 is capable of retaining the tool 14 therein and can similarly utilize the complementarily shaped non-circular cross-sections between the tool holder's 52 swivel portion 56, 56a and the tool 14—see FIGS. 4 and 5.

Figures 3A, 3B, 6A, 6B, 6C, 6D, 7A:
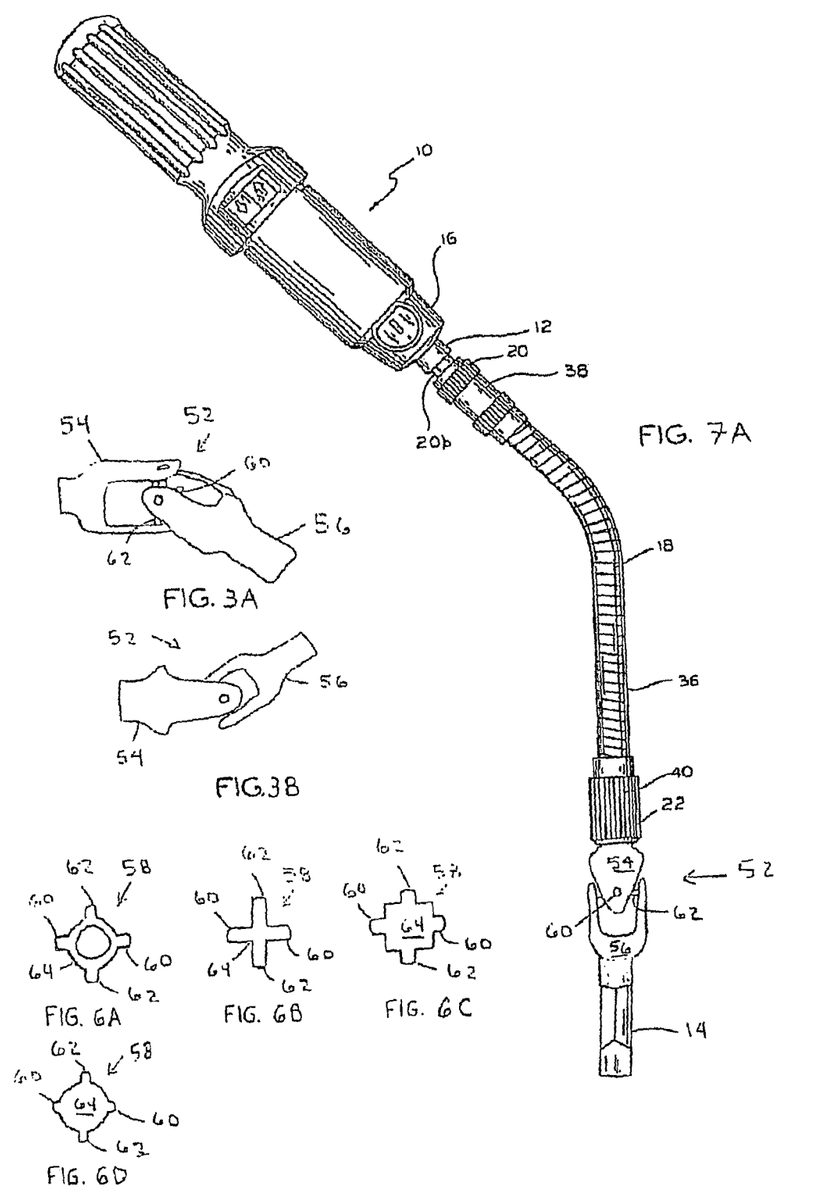
FIGS. 3A and 3B are perspective views of the tool holder of the present invention.
FIGS. 6A, 6B, 6C, and 6D depict various embodiments of the pivot assembly of the present invention.
FIG. 7A is perspective view of an alternative embodiment of the present invention depicting a flexible extension shaft operatively attached to a powered handheld instrument and a tool.
Figure 7B:
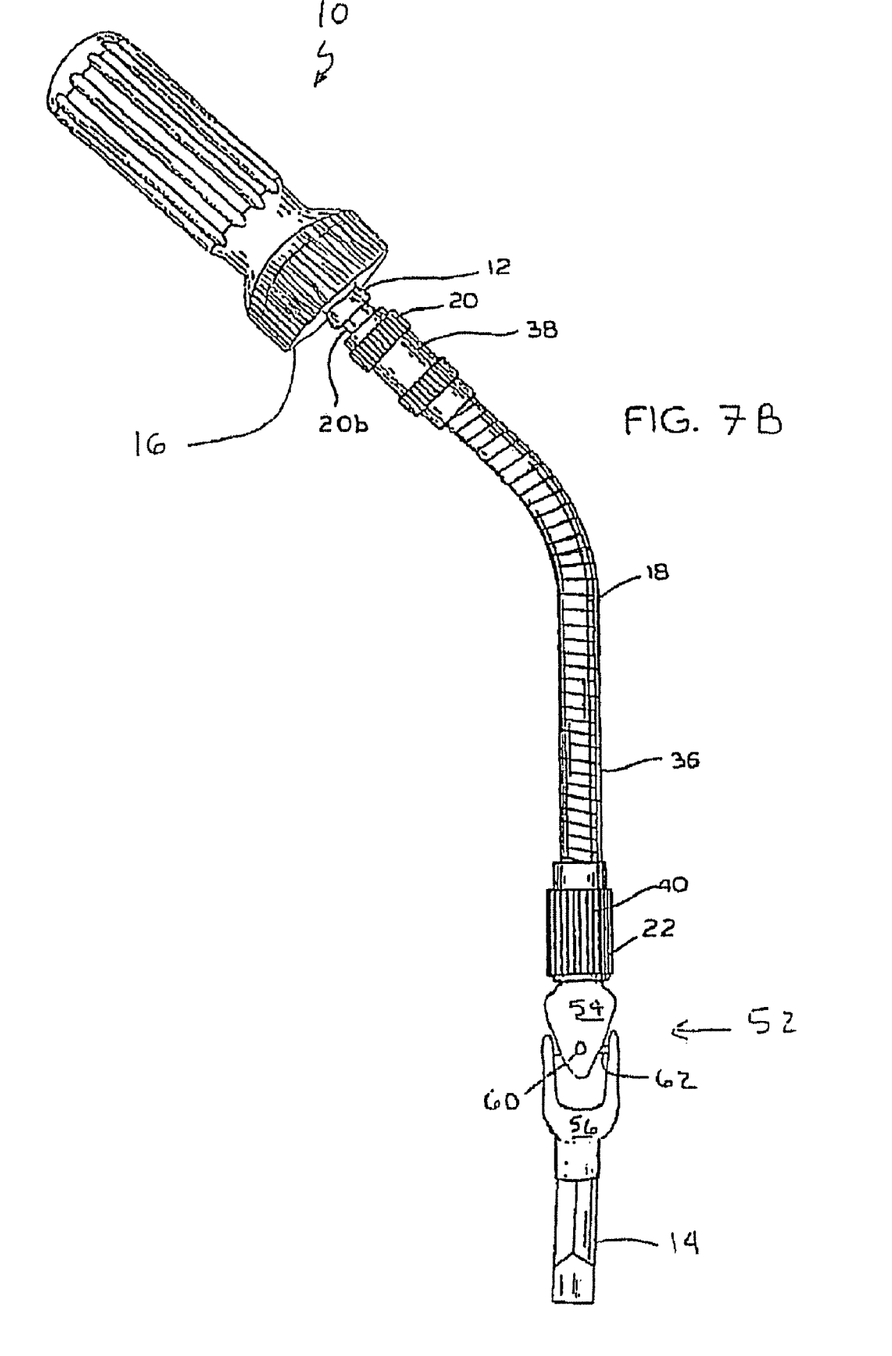
FIG. 7B is perspective view of an alternative embodiment of the present invention depicting a flexible extension shaft operatively attached to a simple handheld instrument and a tool.
Figures 8, 9:
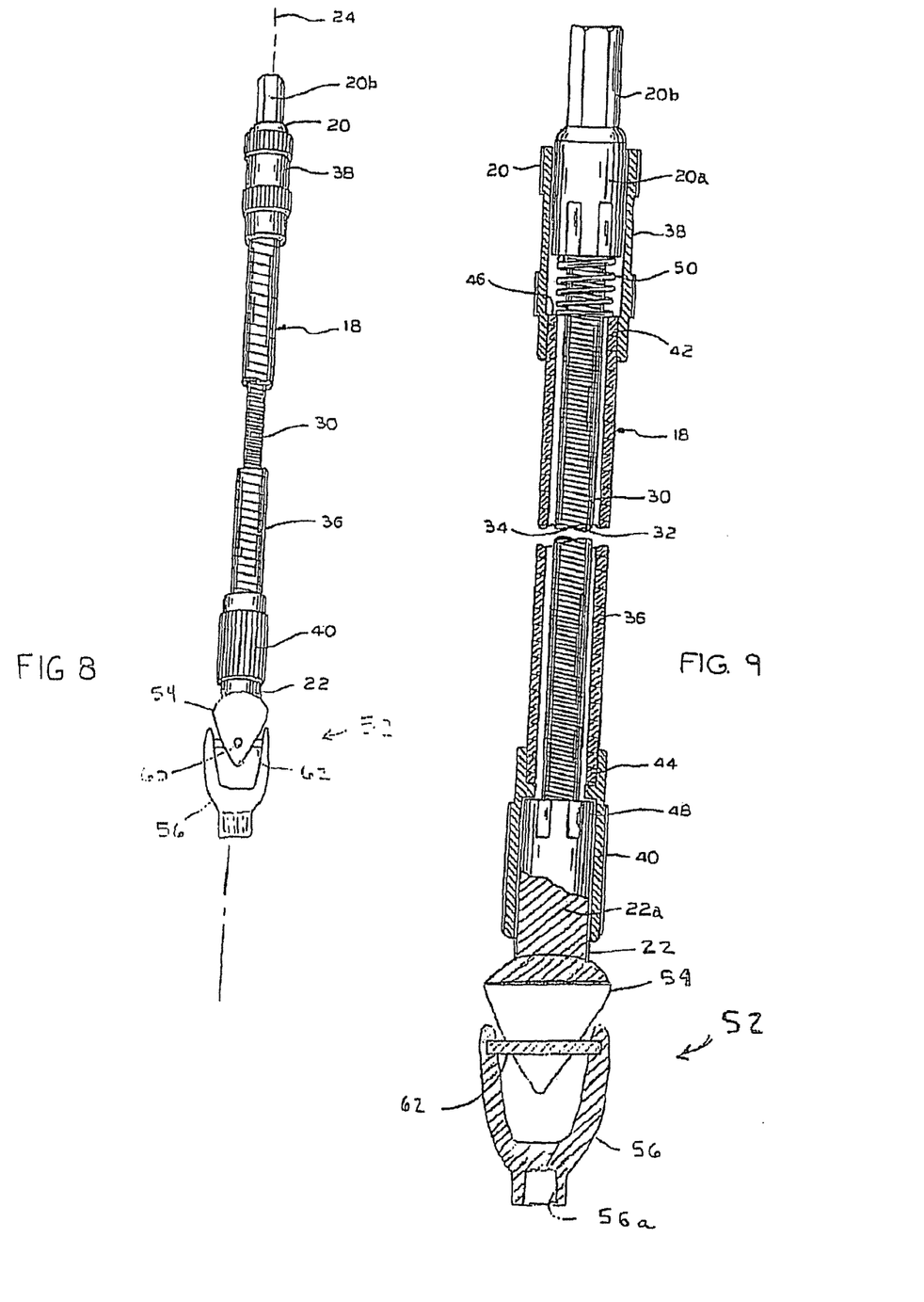
FIG. 8 is a partial perspective view of the flexible extension shown in FIGS. 7A and 7B.
FIG. 9 is a partial cross-sectional view—perpendicular to the axis of the extension shaft—of the flexible extension shaft of the present invention.

As will be appreciated by referring to the figures, particularly FIGS. 7-9, the tool 14 is rotary driven by the chuck 12 of the handheld instrument 10. The handheld instrument can be a simple handle—see FIG. 7B—that can be manually operated, or a powered handle—see FIG. 7A—that can be electrically operated. It will also be appreciated that proximate either ends 20, 22 of the extension shaft 18, a generally cylindrical body portion may be included. One cylindrical body portion, e.g., 20a, may terminate in a male hex shank, e.g., 20b, and the other generally cylindrical body portion, e.g., 22a, may terminate in the tool holder 52 having a base portion 54 and a pivotly connected swivel portion 56, which further includes a female hex shank-receiving opening or collet 56a capable of interconnecting with the tool 14. It will further be appreciated that the chuck 12 includes a female hex shank-receiving opening which, together with the male hex shank 20b, exemplifies one embodiment of the previously described complementarily shaped non-circular cross-section. With this arrangement, the first end 20 of the extension shaft 18 is adapted for axial insertion into the chuck 12. So too the tool holder can be axially inserted into, or aligned with, the second end 22 of the extension shaft; and likewise, the tool 14 can also be axially inserted into swivel portion 56 of the tool holder 52 proximate the second end 22 of the extension shaft 18.

Figure 4:
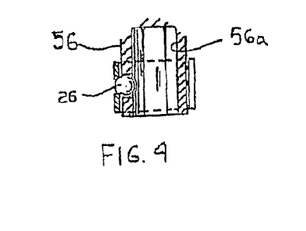
FIG. 4 is a partial cross-sectional view—perpendicular to the axis of the extension shaft—of the swivel portion of the tool holder of the present invention.
Figure 5:
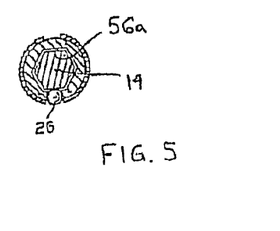
FIG. 5 is a cross-sectional view—aligned with the axis of the extension shaft—of the swivel portion of the tool holder of the present invention with a tool inserted therein.

Magnetic coupling is one of a variety of means for releasably retaining the male hex shank portion within the cooperating female hex receiving portion. Another means for releasably retaining the male hex shank portion within the cooperating female hex receiving portion is shown in FIGS. 4 and 5, which may include a ball or bearing detent 26 associated with a female hex shank-receiving opening that can be incorporated into the swivel portion 56 of the tool holder 52 proximate the second end 22 of the flexible extension shaft 18. In like fashion, the means for releasably retaining cooperatively attached members—e.g., the tool holder 52 and the tool 14—can also be implemented between the chuck 12 and the extension shaft 18, or the extension shaft 18 and the tool holder 52.

A pivot assembly 58 connects the base 54 and swivel 56 portions of the tool holder 52. One embodiment of the pivot assembly 58 is shown in FIGS. 3A, 3B, and 6A-6D and includes a pair of pins, shafts, or axles, wherein a first pin 60 and a second pin 62 lie substantially within a single plane. Preferably, the first and second pins 60, 62 are substantially perpendicular to each other, and are connected together, or are integral with each other, to form a unitary piece. FIGS. 6A, 6B, 6C, and 6D depict several embodiments of the pivot assembly 58 showing the first 60 and second 62 pins being integral with each other and lying within a single plane, i.e., the plane of the paper. The integral pins 60, 62 may be attached through a hub 64; the form of which may include one of several different shapes or geometries—e.g., ring, disk, circular, round, rectangular, box, and diamond—and the hub may or may not lie entirely or substantially within the same plane as the first 60 and 62 second pins.

Figure 10:
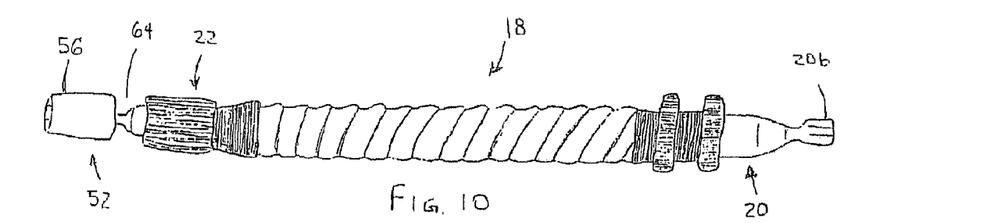
FIG. 10 is a perspective view of an alternate embodiment of the present invention wherein the pivot assembly includes a ball joint having a bearing and a socket.
Figure 11:
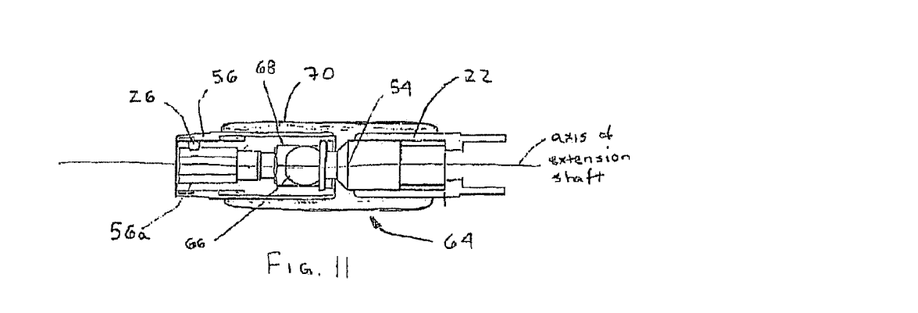
FIG. 11 is a partial cross-sectional view—perpendicular to the axis of the extension shaft—of one embodiment of the pivot assembly of the present invention, wherein a sheath is utilized to cover at least a portion of the tool holder and at least a portion of the end of the extension shaft.
Figure 12:
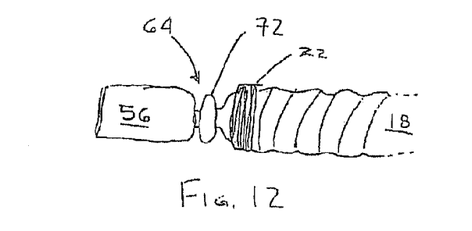
FIG. 12 is a partial view of one embodiment of the pivot assembly of the present invention, wherein a spacer is located proximate the pivot assembly to guard against a user contacting the moving parts of the extension shaft.

Referring now to FIGS. 10-12, an alternate embodiment of the pivot assembly 58 is shown wherein a ball joint 66 is utilized to operatively connect the base 54 and swivel portions 56 of the tool holder 52. The ball joint 66 preferably includes a bearing 68, e.g., hex ball—extending along a neck from the end 22 of the extension shaft 18 or base portion 54, and resides within a socket 74 defined within an end of the swivel portion 56 opposite the end 56a that retains the tool 14. The cooperative connection between the hex ball 68 and the socket 74 enables the swivel portion 56 of the tool holder 52 to be angled, pivoted, or hinged with respect to the base portion 54, and further allows the swivel portion to rotate in response to rotation of the base portion.

Figure 13:
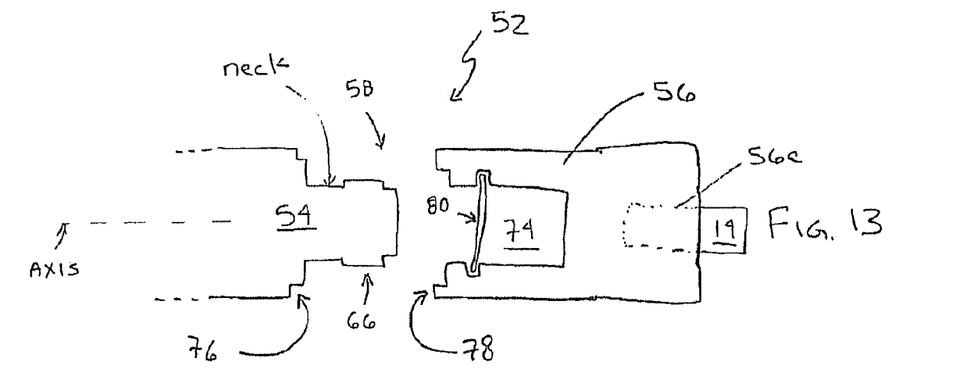
FIG. 13 is a partial view of one embodiment of the tool holder of the present invention depicting one of the means for predisposing the axial alignment and connection of the base and swivel portions of the tool holder.
Figure 14:
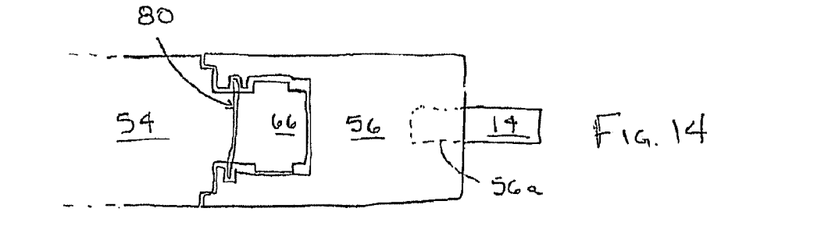
FIG. 14 is another partial view of the embodiment of the tool holder of the present invention depicting the means for predisposing the axial alignment and connection of the base and swivel portions of the tool holder shown in FIG. 13.

In a further alternate embodiment of the pivot assembly 58, the base portion 54 and the swivel portion 56 of the tool holder 52 are biased or predisposed to be substantially in axial alignment when the extension shaft 18 is at rest—thus providing a beneficial feature of a more stable or steady swivel portion to facilitate the insertion and/or removal of the tool 14. FIGS. 13-14 depict one means for predisposing the axial alignment of the base 54 and swivel 56 portions of the tool holder 52 when the tool holder is not in use. In particular, the ball joint 64 is configured such that the base portion 54 and the swivel portion 56 of the tool holder 52 include cooperating annular surfaces 76, 78—e.g., shoulders—about their respective outer perimeters. The cooperating surfaces of the shoulders 76, 78 can be generally described as having mating male-female portions and can include a variety of geometric shapes, e.g., circle, square, star, octagon.

A retaining device 80, such as an internal split ring, is positioned about the axis and neck of the base portion 54 near the hex ball 66 and operatively secured within the socket 74 of the swivel portion 56. The split ring 80 retains the hex ball 66 within the socket 74 and simultaneously permits the hex ball to axially slide a short distance within the socket. When the hex ball 66 is fully inserted into the socket 74, the shoulder 76 of the base portion 54 cooperatively engages with the shoulder 78 of the swivel portion 56 to axially align the base and swivel portions and make a more rigid tool holder 52 having a steady swivel portion with a lesser tendency to hinge, pivot, or angle with respect to the base portion. If the male-female segments of the cooperating shoulders 76, 78 include keyed shapes, e.g., square, star, hexagon; any relative rotational movement between the base and swivel portions will be considerably deterred.

For increasing the operable range of the extension shaft 18, the swivel portion 56 can be axially slid away from the base portion 54 a distance sufficient to disengage and clear the cooperating shoulders 76, 78 of the base and swivel portions, thus allowing the swivel portion the ability to hinge or pivot and be angled with respect to the base portion. The retaining device 80 retains the hex ball 66 within the socket 74 while simultaneously allowing the hex ball to rotate in response to rotation of the extension shaft 18, and thus engage the socket. One of ordinary skill in the art can readily envision that multiple tool holders 52 can be coupled together as needed.

Additional embodiments of the pivot assembly 58 that are within the scope of the present invention include cooperating gears, e.g., beveled, spurred; or mating balls; operatively attached or extending from the respective base 54 and swivel 56 portions. Regardless of which embodiment of pivot assembly 58 is employed during operation with the handheld instrument 10, the extension shaft 18 can be disposed substantially entirely coaxial with the chuck 12, while the tool holder's swivel portion 56, as well as the tool 14 itself, is capable of being positioned at an angle relative to the axis of the chuck.

The present invention further contemplates the tool holder 52 including a means for predisposing the connection or attachment of the base 54 and swivel 56 portions through a bias 82 to axially attract the base and swivel portions toward each other. One such means for predisposing the connection of the base 54 and swivel 56 portions includes a section of either or both of the base and swivel portions having a magnetized segment capable of attracting the other of the base or swivel portions of the tool holder 52. That is, when the extension shaft 18 and/or tool holder 52 is at rest, or not being used, the base 54 and swivel 56 portions are attracted to each other so that the respective shoulders 76, 78 of each portion of the tool holder move toward each other to engage and axially align. The magnetic coupling is sufficient enough to attract the base 54 and swivel 56 portions toward each other to engage the respective cooperating annular surfaces 76, 78 and steady the swivel portion for insertion and/or removal of the tool 14—while simultaneously allowing the base and swivel portions to be slid axially apart a short distance such that they can be angled with respect to each other and yet remain operatively connected by the split ring 80.

Figure 15:
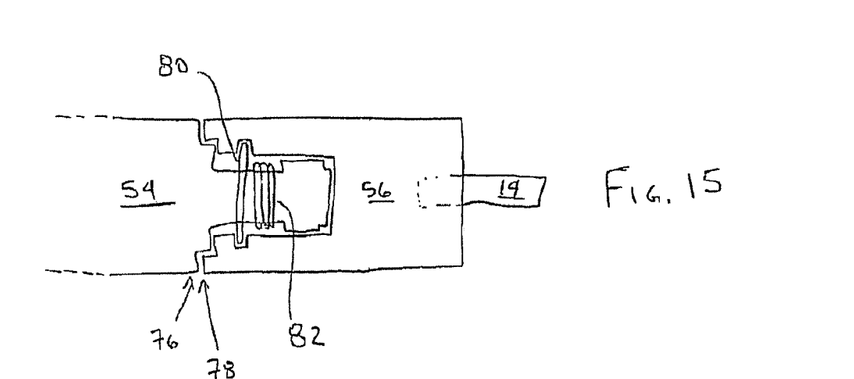
FIG. 15 is a partial view of one embodiment of the tool holder of the present invention depicting another of the means for predisposing the axial alignment and connection of the base and swivel portions of the tool holder; and, FIG. 16 is a partial view of an alternate embodiment of the sheath having multiple portions for covering at least a portion of the moving components of the tool holder.

FIG. 15 depicts another embodiment of the means for predisposing the axially aligned connection of the base 54 and swivel 56 portions, wherein the bias 82 includes a spring positioned about the neck of the base portion proximate the hex ball 68 and between the split ring 80 and the inner portion of the socket 74 that assists in the retention of the split ring therein. The force exerted by the spring 82 brings the cooperating shoulders 76, 78 of the base 54 and swivel 56 portions together and into engagement; thus axially aligning the base and swivel portions of the tool holder 52 and steadying the swivel portion for insertion and/or removal of the tool 14 when the extension shaft 18 is at rest.

Referring to FIG. 11, a protective mechanism 70, e.g., sheath, can be incorporated with the extension shaft 18 of the present invention to cover the pivot assembly 58 proximate the end of the extension shaft and the tool holder 52. The durable sheath 70 may include a single piece or multiple pieces and is sufficiently flexible and/or rigid so that it does not impede movement of the swivel portion 56 or base portion 54 of the tool holder 52. The sheath includes a material capable of protecting the operator from harmful contact with the moving parts of the tool holder when the swivel portion is angled, pivoted, or hinged with respect to the base portion 54 or the extension shaft 18 during rotation.

Figure 17:
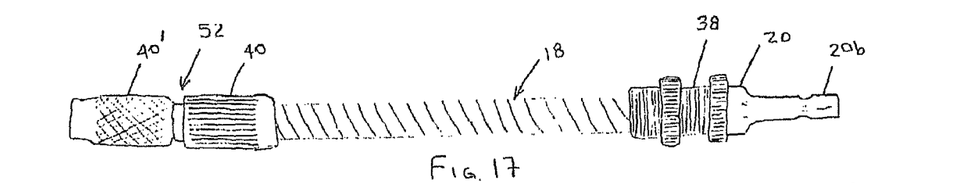
FIG. 17 depicts another alternate embodiment of the extension shaft of the present invention wherein cylindrical fittings cover portions of the tool holder.
Figure 18:
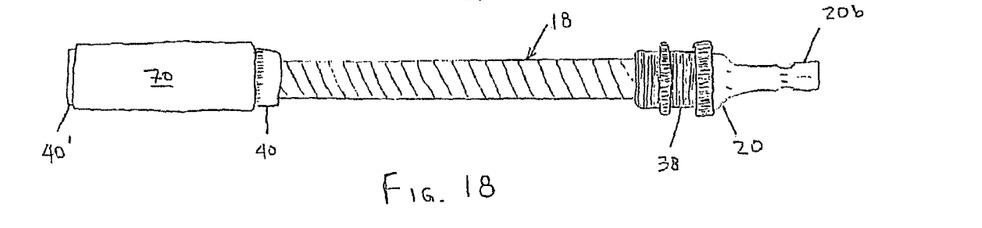
FIG. 18 depicts the alternate embodiment of the extension shaft of the present invention shown in FIG. 17 wherein a sheath is utilized to cover at least a portion of the tool holder.

In one embodiment of the sheath 70 shown in FIGS. 17 and 18, sections of the swivel 56 and base 54 portions of the tool holder 52 are retained within respective cylindrical fittings 40, 40' such that rotation of the swivel and base portions can be achieved without rotation of the respective cylindrical fitting. One of the cylindrical fittings 40, 40' is positioned about at least a section of the swivel portion 56 of the tool holder 52 and the other of the cylindrical fittings is positioned about at least a section of the base portion 54 of the tool holder. The outer surface of the cylindrical fitting 40' positioned about the swivel portion 56 of the tool holder 52 includes a diamond knurled finish (e.g., cross-hatched) and the outer surface of the cylindrical fitting 40 positioned about the base portion 56 of the too holder includes a fluted knurled finish (e.g., longitudinal ridges). The sheath 70 includes a flexible rubber-type material and may also include an outer surface that includes knurling. The sheath 70 is slid over the cylindrical fittings 40, 40', wherein the diamond knurled surface about the swivel portion 56 facilitates retention of the sheath while the fluted knurled surface about the base portion 54 allows the sheath to slide back and forth when the tool holder 52 is hinged or pivoted.

Figure 16:
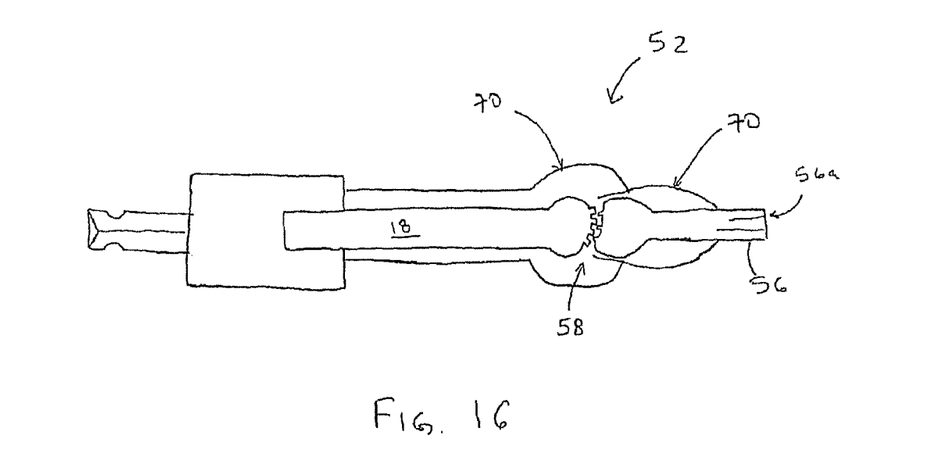

If the sheath 70 includes multiple pieces, one segment of the sheath covers over of the base 54 or swivel 56 portions and the other segment of the sheath covers over the other of the base or swivel portions. As shown in FIG. 16, each segment of the sheath 70 preferably includes a semi-rigid, bulbous shape, wherein one of the sheath segments partially fits within the an opening of the other of the sheath segments to cooperatively hold both sheath segments together.

Another protective mechanism capable of being incorporated with the tool holder 52 of the present invention is a spacer 72. As shown in FIG. 12, the spacer 72 is preferably annular or toroidal in shape and includes a durable and flexible material, e.g., rubber, silicon; that can be located about the axis of the extension shaft 18 and proximate the neck of the base portion 56 and bearing 66 of the ball joint 64 to assist in preventing an operator's hand or finger from being placed into contact with the movable parts of the tool holder 52.

Referring again to FIGS. 7-9, another embodiment of the present invention is shown wherein the extension shaft 18 is flexible. The flexible extension shaft 18 includes a plurality of concentric coil springs 30, 32, 34 in tightly wound adjacent relation extending between and secured to the generally cylindrical body portions 20a, 22a of the first and second ends 20, 22 of the flexible extension shaft 18 to accommodate universal deflection of the flexible extension shaft and/or the tool 14 relative to the axis of the chuck 12. It will also be seen that a flexible sleeve 36 is disposed about the concentric coil springs 30, 32, 34. As illustrated, the flexible sleeve 36 has cylindrical fittings 38, 40 secured thereto at opposite ends 42, 44 thereof to receive one of the cylindrical body portions 20a, 22a therein and the flexible sleeve 36 and cylindrical fittings 38, 40 define shoulders 46, 48 internally of each of the fittings 38, 40 to form stops for the cylindrical body portions 20a, 22a.

More specifically, the cylindrical body portions 20a, 22a are spaced apart by a distance greater than the distance between the shoulders 46, 48 in the cylindrical fittings 38, 40 to permit limited axial movement of the cylindrical body portions 20a, 22a and the concentric coil springs 30, 32, 34 relative to the cylindrical fittings 38, 40 and the flexible sleeve 36. With this construction, a shaft biasing coil spring 50 is disposed about the concentric coil springs 30, 32, 34 of the flexible extension shaft 18 between the shoulder 48 in one of the cylindrical fittings 40 in the corresponding one of the cylindrical body portions 22a to normally bias the other of the cylindrical body portions 20a into engagement with the shoulder 46 in the other of the cylindrical fittings 38.

It is to be understood that the flexible sleeve 36 can also be implemented with the more rigid extension shaft shown in FIGS. 1 and 2—as would be the case when the flexible extension shaft shown in FIGS. 7-9 is utilized in a linear configuration.

As should now be appreciated, the handheld instrument 10—especially a portable electric screwdriver—is extremely versatile when utilized with the extension shaft 18 of the present invention. Because the tool holder 52 is deflectable relative to the axis of the chuck 12—as well as the axis of the extension shaft 18—the extension shaft enables the use of the handheld instrument 10 in hard-to-reach or spatially restricted areas because the tool 14 can be disposed at an acute angle relative to the axis of the chuck 12 by the pivoting, hinging, and/or swiveling provided by the unique pivotal coupling inherent within the tool holder 52—whether the embodiment of the pivot assembly 58 being utilized includes the ball joint 64 (see FIGS. 10-12) or the dual pivot pins 60, 62 of the pivot assembly 58 that lie substantially within the same plane and preferable perpendicular to each other (see FIGS. 3A, 3B, 6A, 6B, 6C, and 6D).

The range of angular movement for the tool 14 relative to the axis of the chuck 12 can further be increased when the tool holder 52 is utilized with an extension shaft 18 that is flexible. Because the flexible extension shaft 18 is universally deflectable relative to the axis of the chuck 12, the flexible extension shaft 18 enables the use of the handheld instrument 10 in hard-to-reach or spatially restricted areas because the tool 14 can be disposed at an acute angle relative to the axis of the flexible extension shaft as well as the chuck 12 by deflecting or bending the flexible extension shaft such as illustrated in FIG. 7. The concentric coil springs 30, 32, 34 rotate internally of the flexible sleeve 36 and the difference in distance between the cylindrical body portions 20a and 22a and the cylindrical fittings 38 and 40 accommodate the arc into which the flexible extension shaft 18 is oftentimes advantageously deflected and held during use. In this configuration, the flexible sleeve 36 permits the user to grip the flexible extension shaft 18 and hold it in a deflected position during use without exposure to the moving parts.

Figure 19:
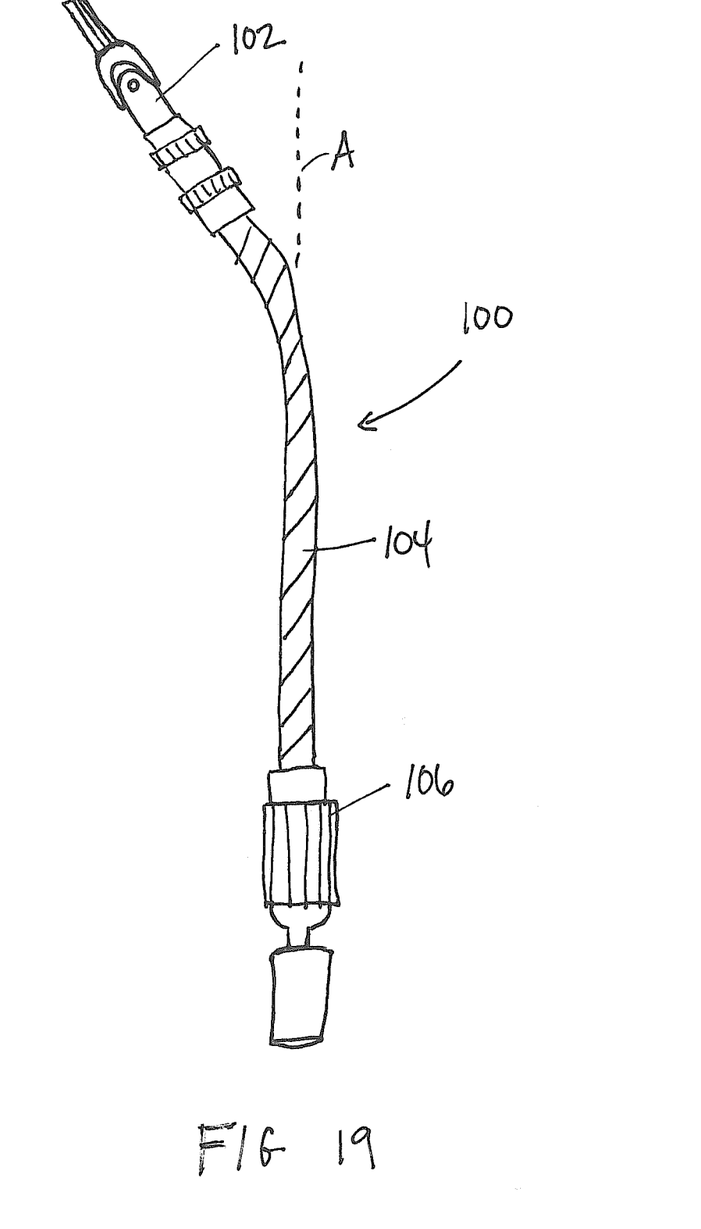
FIG. 19 depicts an alternative embodiment of the present invention wherein both ends are capable of bending independently of the flexible extension shaft.

In another embodiment of the present invention shown in FIG. 19, the invention relates to tool 100 having first end 102, extension shaft 104, and second end 106.

First end 102 is adapted to cooperate with a chuck of a device for providing a rotary motion. One of ordinary skill in the art would appreciate that many configurations for first end 102 are possible.

Extension shaft 104 is capable of being bent about an axis (A) and capable of receiving the rotary motion. Extension shaft 104 may have the attributes discussed herein regarding other embodiments of the present invention.

Second end 106 is adapted to hold an implement for rotary driven motion. Again, one of ordinary skill in the art would appreciate that there are numerous configurations for second end 106.

In this embodiment of the present invention, both the first end 102 and the second end 104 are capable of being bent, independently of the extension shaft 104. In other words, both first end 102 and second end 106 include a configuration such as that depicted in FIGS. 1, 2, 10-12, and 13-16. Thus, while the entire tool 100 will be able to be bent, each end 102, 104 will also independently bend, or deflect.

Such an embodiment will allow for further deflection of the device and greater range of movement to allow the tool to work in confined spaces.

Figure 20:
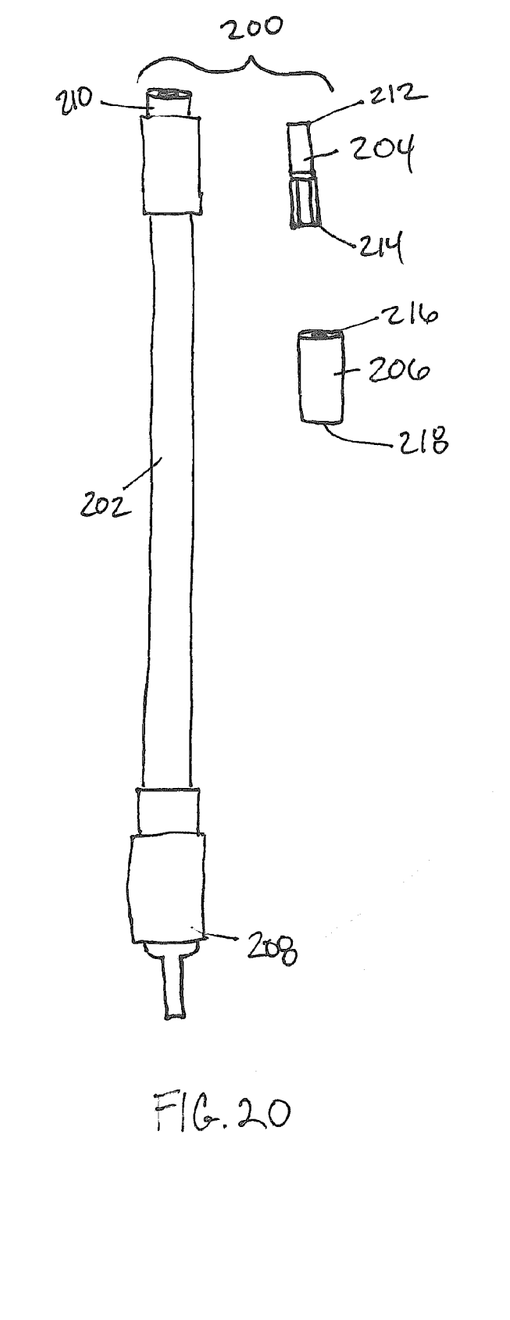
FIG. 20 depicts a kit according to the present invention including a shaft, a male member and a female member.
Figure 21:
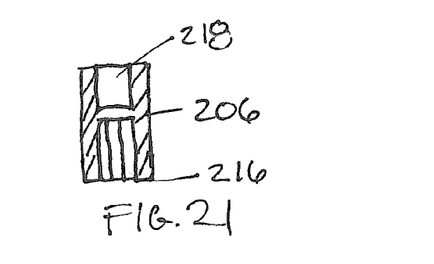
FIG. 21 depicts a cutaway view of a female member in a kit according to the present invention.
Figure 22:
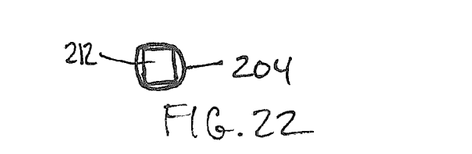
FIG. 22 depicts a top view of a male member in a kit according to the present invention.

Referring now to FIGS. 20-22, in still another embodiment of the present invention, the invention relates to a kit 200 having flexible extension shaft 202, male member 204, and, female member 206.

Flexible extension shaft 202 is capable of being bent about an axis and includes first end 208 and second end 210. First end 208 has a non-circular cross section, and second end 210 also has a non-circular cross section. For example, first end 208 could have a square male configuration and second end 210 could have a square female configuration.

Male member 204 has first end 212 with a configuration complementary to second end 210 of flexible extension shaft 202, and second end 214 having a configuration different than the configuration of first end 212 of male member 204. For example, first end 212 could have a male square configuration and second end 214 could have a male hex configuration.

Female member 206 has first end 216 with a configuration complementary to the configuration of second end 214 of male member 204, and second end 218 having a configuration different than the configuration of first end 214 of female member 216. For example, first end 216 could have a female hex configuration and second end 218 could have a female square configuration.

Such a kit 200 is believed to be beneficial in that it would allow for additional extension to the shaft 202 by allowing the male and female members 204, 206 to be added to the shaft 202 to increase its overall length. Furthermore, such a kit 200 will allow for the shaft 202 to be used with a variety of tools for imparting rotation motion, i.e., ratchet, power drill, hand drill, hand driver, etc. In addition, it will allow shaft 202 to be used with at least two types of implements, those having square configurations and those having hex configurations. This would eliminate the need for two shafts for the two types of implements.

Figure 23:
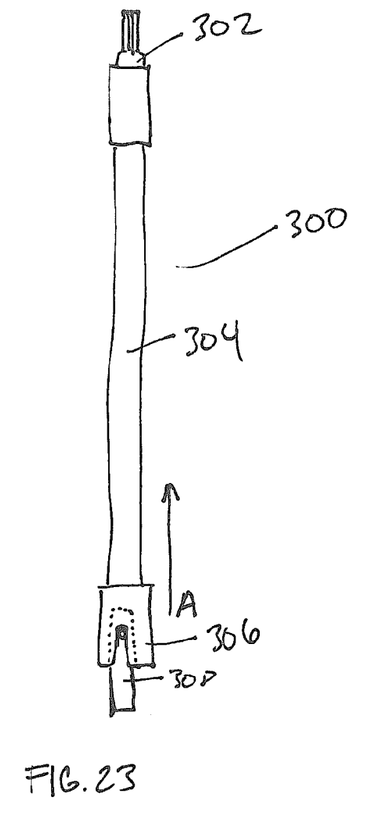
FIG. 23 depicts an alternative embodiment of the present invention wherein the tool includes a rotatable member having a first and second implement.
Figure 24:
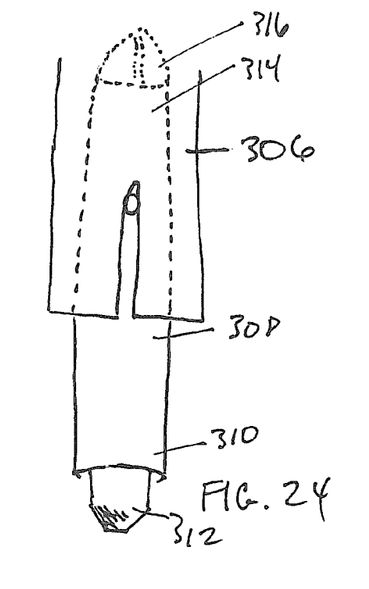
FIG. 24 is a close up view of a rotatable member.
Figure 25:
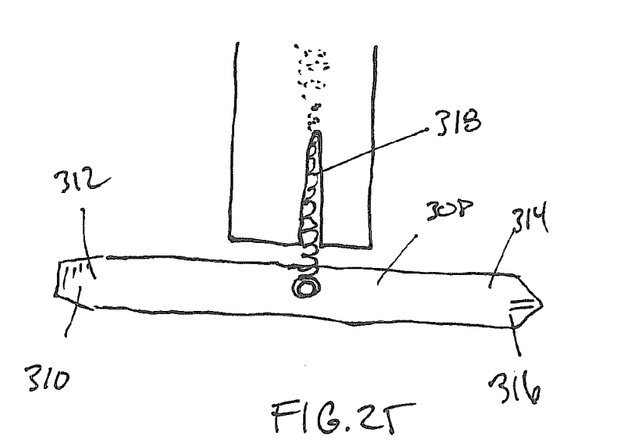
FIG. 25 is another view of a rotatable member.

Finally, referring to FIGS. 23-25, another embodiment of the invention comprises a tool 300 having first end 302, flexible extension shaft 304, and second end 306.

First end 302 is capable of being adapted to an instrument having a chuck to impart a rotary motion to the tool. Again, one of ordinary skill in the art would appreciate that there are numerous configurations available for first end 302.

Flexible extension shaft 304 is capable of being bent about an axis and capable of receiving the rotary motion from the first end 302. Flexible extension shaft 304 may comprise any of the attributes and elements discussed herein with respect to other embodiments of the invention.

Second end 306 is capable of receiving the rotary motion from the flexible extension shaft 304. Second end 306 also includes a rotatable member 308 with a first end 310 having first implement 312 and second end 314 having a second implement 316. Rotatable member 308 is integral, i.e., attached, to second end 314. Preferably, second end 306 of the tool 300 includes a spring 318 to bias rotatable member 308 towards first end 302 of the tool 300 (in the direction of arrow A (see FIG. 23)).

First and second implements 312, 316 may be integral to rotatable member 308 (see, FIG. 25). Alternatively, rotatable member 308 can hold first and second implements 312, 316 (see, FIG. 24), allowing for greater variety and flexibility of use for the tool 300.

In use, rotatable member 308 can have a first implement, for example, a drill bit and a second implement, for example a screw driver tip. The user can drill a hole using the drill bit, flip the rotatable member 308 and immediately proceed to drive a screw with the screw driver tip. By way of another example, first implement could be a flat screw driver tip, and second implement could be a Phillips screw driver tip.

Such a device will provide a variety of options for the tool and minimize the number of tools needed for a job. Further, it will require less time to change the implements allowing tasks and jobs to be completed at a much quicker pace.

While in the foregoing there has been set forth a preferred embodiment of the invention, it is to be understood that the present invention may be embodied in other specific forms without departing from the spirit or central characteristics thereof The present embodiments, therefore, are to be considered in all respects as illustrative and not restrictive, and the invention is not to be limited to the details given herein. While specific embodiments have been illustrated and described, numerous modifications come to mind without significantly departing from the characteristics of the invention and the scope of protection is only limited by the scope of the accompanying Claims.

What is claimed is:

1. A tool comprising:
    a first end capable of being adapted to an instrument having a chuck to impart a rotary motion to the tool,
    a flexible extension shaft capable of being bent about an axis and capable of receiving the rotary motion from the first end
    a second end capable of receiving the rotary motion from the flexible extension shaft, and having a rotatable member with a first end having a first implement and a second end having a second implement, wherein the second end has a spring to bias the rotatable member towards the first end of the tool.

2. The tool of claim 1 wherein the first implement and the second implement are removably received by the rotatable member.

3. The tool of claim 1 wherein the first implement and the second implement are integral with the rotatable member.

* * * * *